J. C. McINTYRE.
CORN CUTTING MACHINE.
APPLICATION FILED APR. 10, 1913.
1,215,563.
Patented Feb. 13, 1917.
6 SHEETS—SHEET 2.
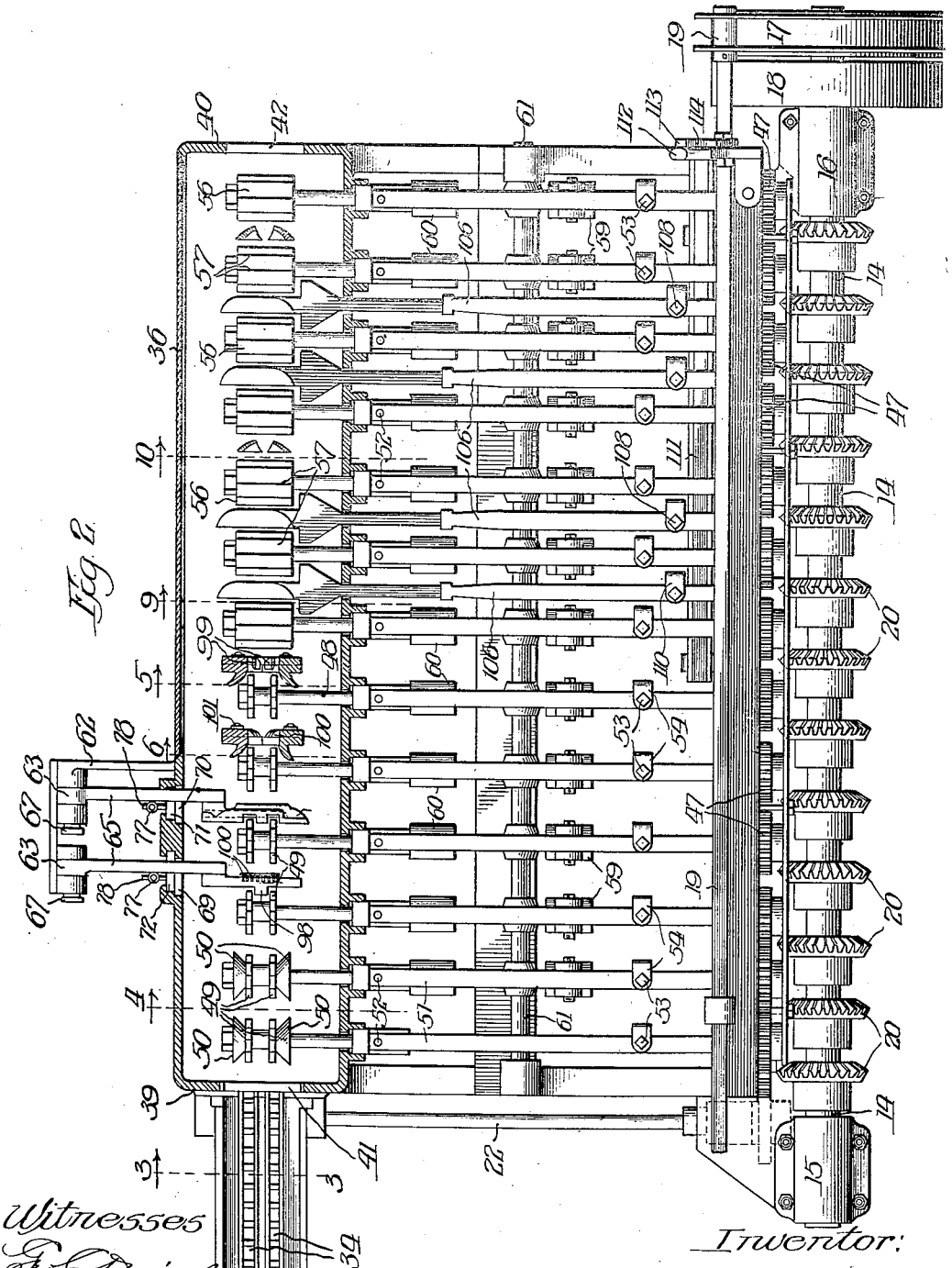
Witnesses
Inventor:
John C. McIntyre, J. C. McINTYRE.
CORN CUTTING MACHINE.
APPLICATION FILED APR. 10, 1913.
1,215,563.
Patented Feb. 13, 1917.
6 SHEETS—SHEET 3.
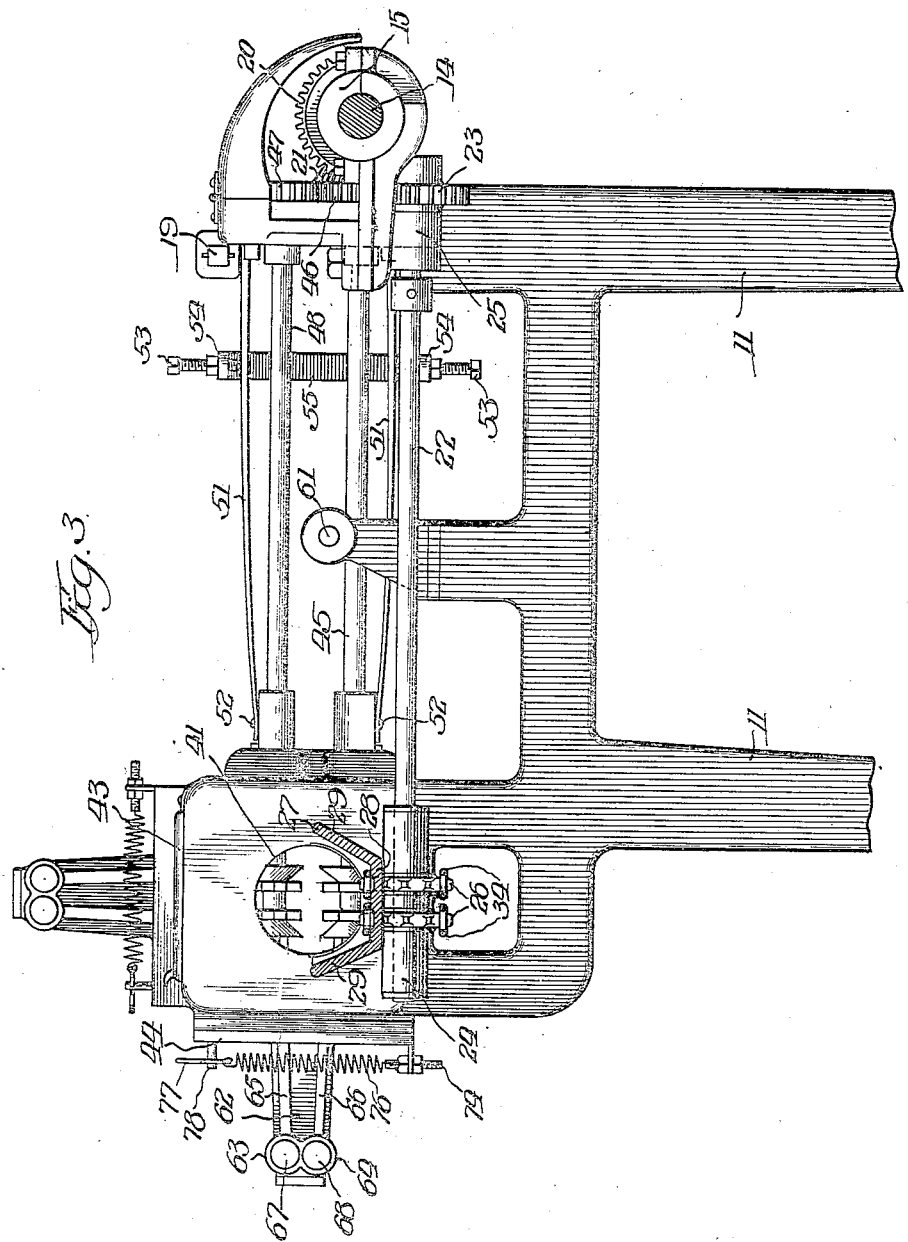
Witnesses:
Inventor:
John C. McIntyre,
By Linthicum, Bell & Fuller
Attys.

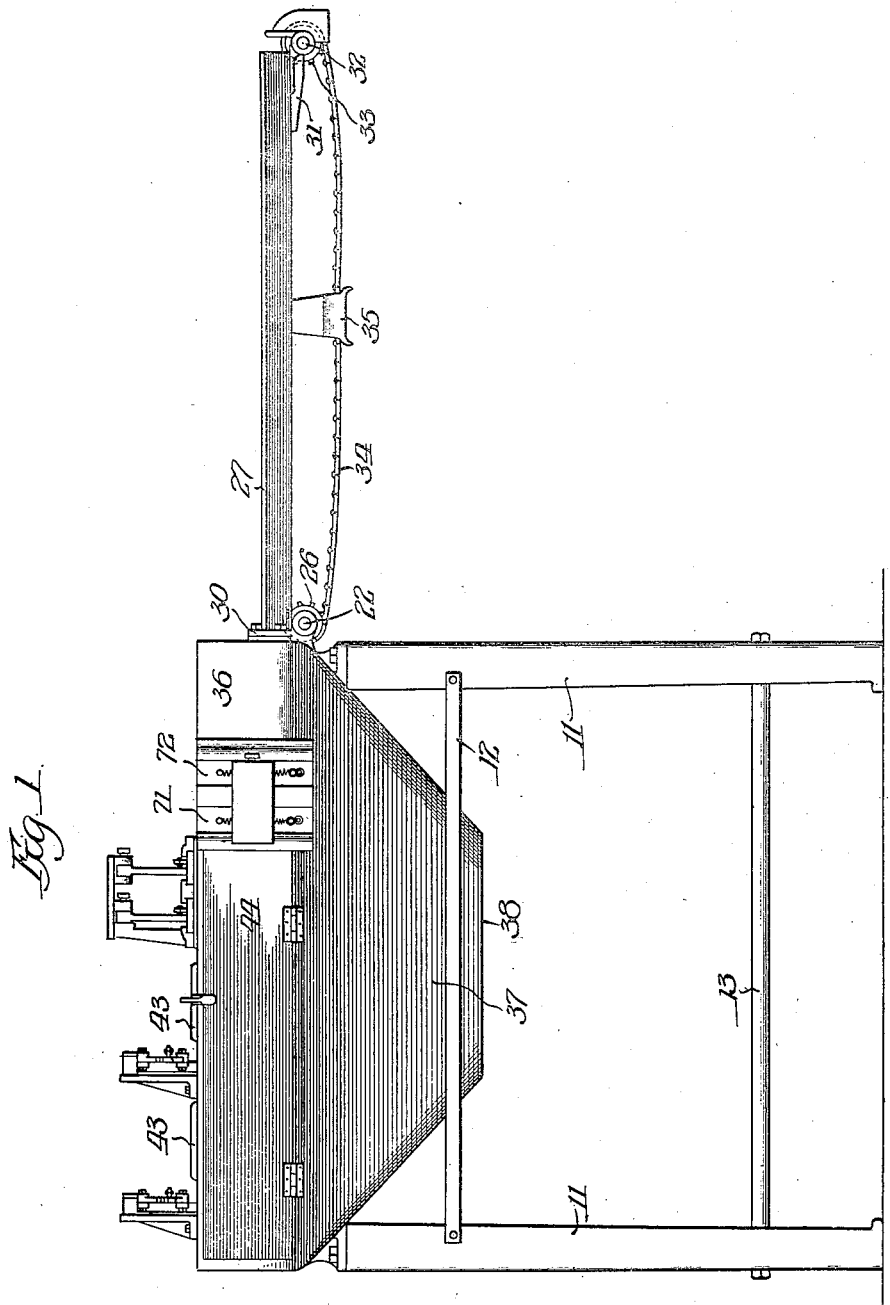

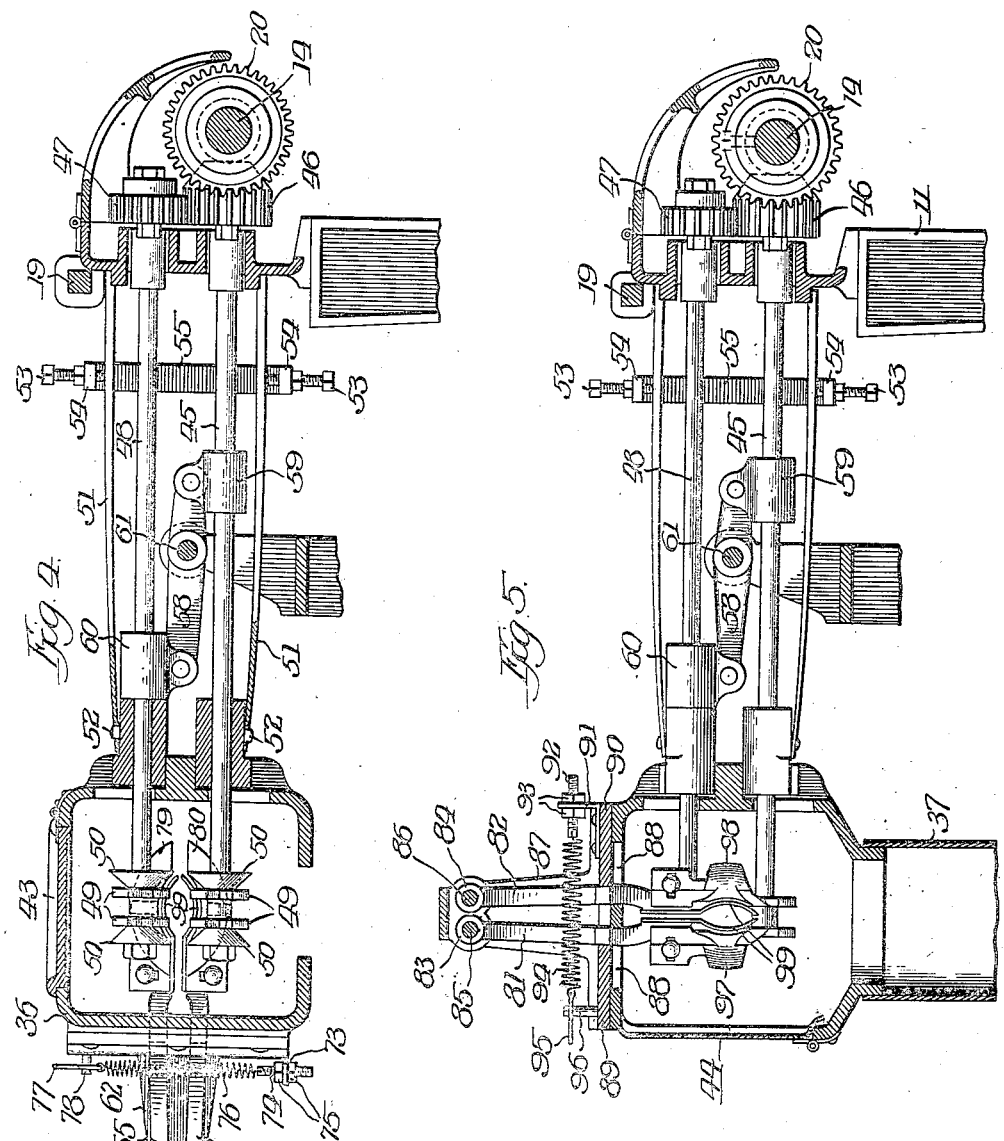

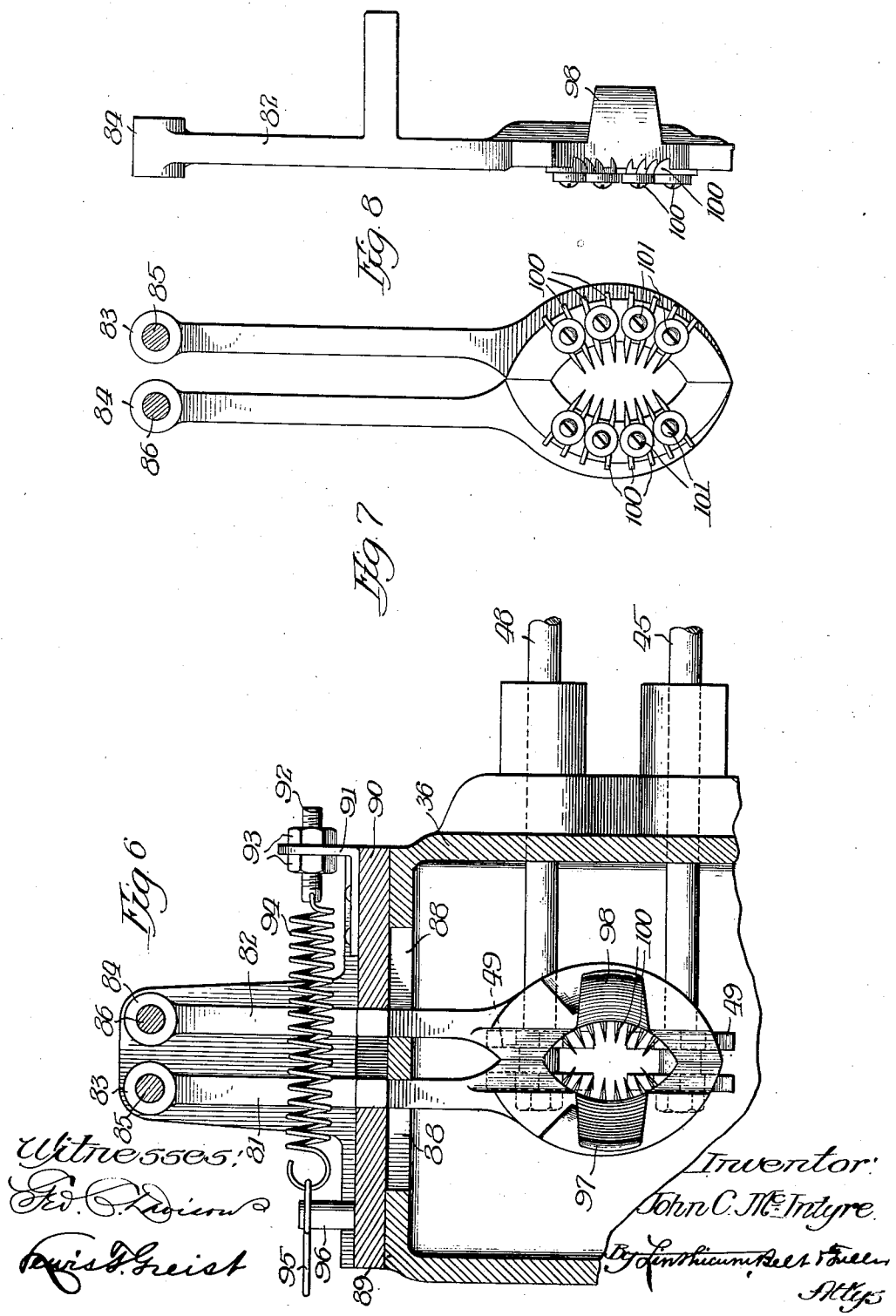

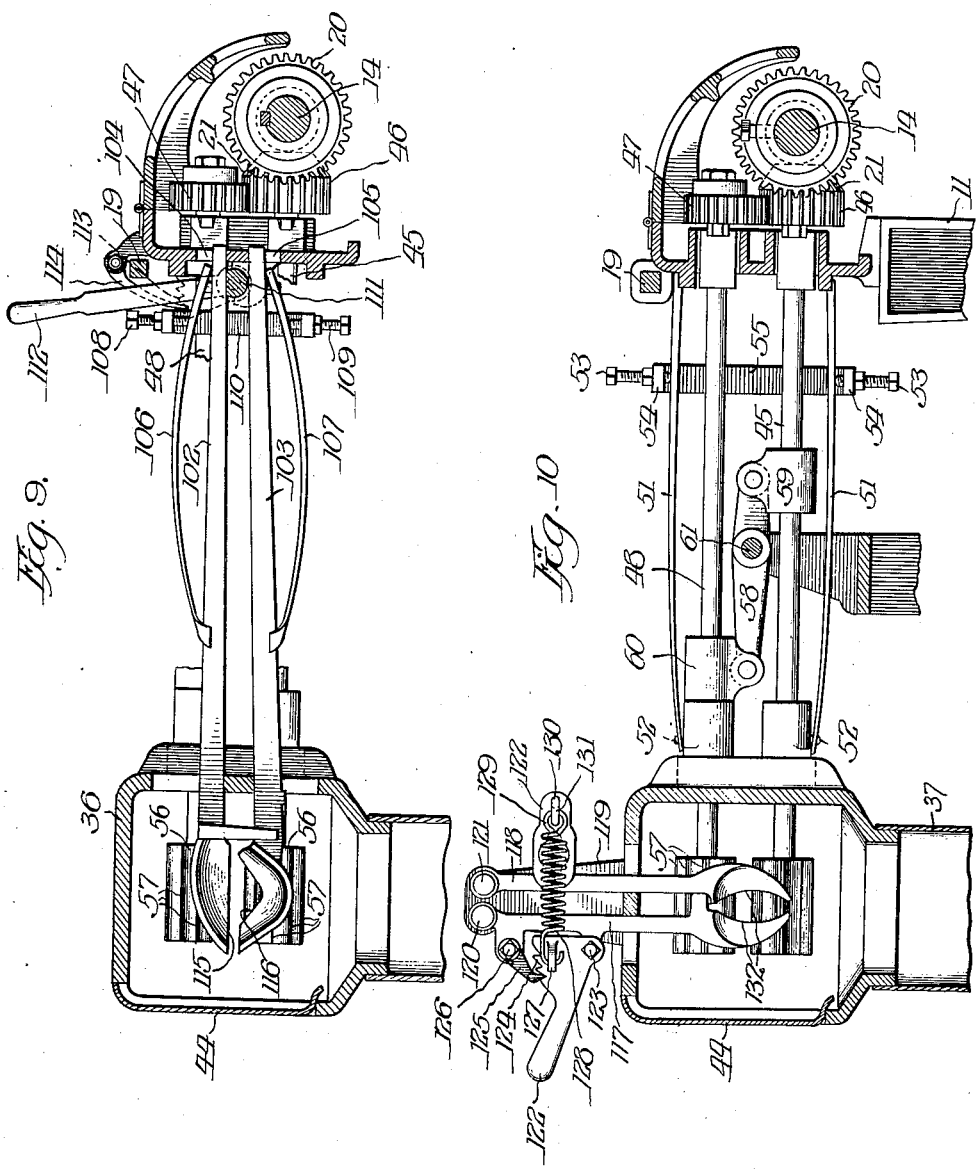

UNITED STATES PATENT OFFICE.

JOHN C. McINTYRE, OF HOOPESTON, ILLINOIS, ASSIGNOR TO SPRAGUE CANNING MACHINERY COMPANY, OF CHICAGO, ILLINOIS, A CORPORATION OF ILLINOIS.

CORN-CUTTING MACHINE.

1,215,563.  Specification of Letters Patent.  Patented Feb. 13, 1917.

Application filed April 10, 1913.  Serial No. 760,136.

*To all whom it may concern:*

Be it known that I, JOHN C. McINTYRE, a citizen of the United States, residing at Hoopeston, in the county of Vermilion and State of Illinois, have invented certain new and useful Improvements in Corn-Cutting Machines, of which the following is a specification.

This invention relates to machines for cutting green corn from the ear preparatory to canning, and particularly to improvements in that general type of corn cutting machines in which the ears of corn deprived of their husks are fed longitudinally between curved sharp knives and between blunt scrapers which cut and scrape the kernels from the cob; provision being made for automatically adjusting the cutting and scraping tools to conform to the different sizes of ears fed to the machine as also for manual adjustment of the tools to effect a cut of greater or less depth, and for the substitution of parts to effect at will a slitting of the kernels as well as a cutting and scraping.

The objects of the invention are to provide more efficient means for accurately feeding the ears of corn, for automatically centering the ear with reference to the tools and adjusting the latter to the size of the ear, for regulating the tension or yielding pressure of the tools by which they are held to their work, for controlling the depth of cut, and in short to provide a machine which shall comprise an exceedingly efficient, compact and flexible combination of elements coöperating to automatically remove the kernels of green corn from the ear in a thorough and efficient manner.

In order that the invention may be readily understood a complete practical embodiment of the same is set forth in the accompanying drawings and in the detailed description based thereon. As, however, the invention is capable of embodiment in other and varied constructional forms the description and drawings are to be construed in an illustrative and not in an unnecessarily limiting sense.

In the drawings:

Figure 1 is a front elevation of the machine;

Fig. 2 is a top plan view with the cover and a portion of the feed trough removed;

Fig. 3 is a transverse vertical section on the line 3—3 of Fig. 2;

Figs. 4, 5, and 6 are fragmentary transverse vertical sections on the lines 4—4 and 5—5 and 6—6 respectively of Fig. 2;

Fig. 7 is a detail side elevation of a pair of slitting members;

Fig. 8 is an edge view of one of the members shown in Fig. 7; and

Figs. 9 and 10 are fragmentary transverse vertical sections taken on the lines 9—9 and 10—10 respectively of Fig. 2.

The machine is shown as supported upon corner standards 11 connected by upper and lower cross braces 12 and 13 respectively. The main shaft 14 suitably journaled at 15 and 16 has mounted thereon fast and loose pulleys 17 and 18 adapted to be driven by a belt from any suitable source of power under control of a belt shifter 19. The main shaft has fixed thereon a series of bevel gears 20 each in mesh with a bevel gear 21 fixed upon the lower member of two shafts arranged in pairs and which will be hereafter described in detail. The counter shaft 22 carries a pinion 23 in mesh with a pinion carried by said lower tool shaft, hereafter described, by which the rotary movement of the main shaft 14 is transmitted to the said counter shaft 22. Upon the opposite end of the shaft 22, which is suitably journaled in the machine frame at 24 and 25, is mounted a pair of sprocket wheels the members of which are designated as 26, 26. A feed trough 27 having a horizontal bottom 28 and upwardly flaring side walls 29, 29 has its forward end bolted to the machine frame at 30 and at its rear end is provided with a bearing bracket 31 in which is journaled the shaft 32 of a second pair of sprocket wheels the members of which are indicated at 33, 33. A pair of sprocket chains 34, 34 travel around the two pairs of sprocket wheels sliding upon the horizontal bottom of the trough 27 and upon their return beneath the trough supported by the guide bracket 35. The sprockets of each pair are spaced apart a sufficient distance so that the adjacent edges of the chains will likewise be spaced apart to constitute an endless conveyer having a depressed medial portion formed by the space between the links of the two chains, said space corresponding to the center line of the trough bottom. As the ears of corn are deposited within the trough 27 upon the traveling chains 34 they naturally assume a position mid way between the walls of the trough and above the depression between the two chains whereby they are automatically positioned in line centrally of the trough regardless of their size, a manifest advantage over a feed trough provided with a single conveyer chain where the ear has a tendency to roll off the elevated chain into the space at one side of the same.

The machine frame consists, generally speaking, of a rectangular elongated portion 36, and a lower hopper-like portion 37 open below at 38 for discharge into a suitable receptacle such as a chute leading to a silking machine, not shown. The two ends of the rectangular casing 36 are closed by end plates 39 and 40, the former provided with an inlet opening 41 and the latter with a discharge opening 42 advantageously circular in outline and concentric with the axis of the casing portion 36, which latter is preferably provided with upper hinged covers 43 and side doors 44 to afford access to the interior for inspection and repairs. Extending transversely of the machine is a series of pairs of tool shafts the members of each pair arranged in superposed parallel spaced relation, the lower member 45 of each pair having fixed upon its rear end one of the bevel gears 21 before referred to, which is in mesh with one of the bevel gears 20 whereby the said shaft member 45 is driven. It also has fixed thereon adjacent the bevel gear 21 a pinion 46 which is in mesh with a similar pinion 47 fixed upon the rear end of the upper shaft member 48 of the pair, the shafts 45 and 48 being therefore rotated in unison in opposite directions. The front ends of the shafts 45 and 48 carry various rotary members coöperating to advance the ears of corn longitudinally of the casing 36 to present the same successively to the various tools arranged to act thereon.

The first two pairs of transverse shafts have mounted upon their forward ends spur wheels 49 arranged in spaced relation and in line with the two chains 34 and upon each side of the spur wheels are fixed inwardly coned guard disks 50, 50. The four succeeding pairs of transverse shafts 45 and 48 carry spur wheels 49 without the flanking inwardly coned guard disks 50. The pair of spur wheels and coned disks mounted upon the lower shafts 45 are immediately beneath and rotate in a plane with the corresponding spur wheels and coned disks of the respective upper shafts 48 so that an ear of corn entered through the opening 41 is caught by the upper and lower spur wheels and fed forward between the coned disks and spur wheels. The shafts 45 and 48 are pressed toward each other by means of leaf springs 51 bearing upon the forward ends of the shafts at 52 and suitably seated in the rear end of the frame, the tension of the springs being regulable by means of set screws 53, 53 threaded in the arms 54, 54 of a yoke 55 so that the yielding pressure of the spur wheels upon the upper and lower sides of the ear may be regulated at will.

Beyond those transverse shafts 45 and 48 which carry the spur wheels 49 the pairs of shafts 45 and 48 are provided at their forward ends with substantially cylindrical rolls 56 having peripheral longitudinally extending ribs or vanes 57 which likewise coöperate above and below to feed the ears of corn longitudinally of the machine toward the discharge opening 42. These shafts are similarly maintained under tension to yieldingly press the rolls toward each other.

Of the first pair of shafts 45, 48 the shaft 45 rests at all times in its lowermost position and the shaft 48 yields upwardly to an extent sufficient to accommodate between the first set of spur wheels 49 an ear of corn received from the conveyer trough, the interspace between the two spur wheels occupying such a relation to the trough that the point of an ear of corn, whatever its diameter, will enter between the rolls. If the ear is a small slender one it will be elevated by the rolls so as to bring its axis approximately into line with the axis of the tools mounted within the elongated casing 36.

The remaining shafts 45, 48 are connected together in such a way as to equalize their movement, the upper and lower feed wheel or roll of each set moving toward and from each other in equal degree. This is accomplished by means of an equalizing arm 58 for each set of shafts 45, 48 one end of the arm pivoted to a sleeve 59 sliding upon the shaft 45 and the other end of the arm pivoted to a sleeve 60 sliding upon the shaft 48. All of the arms are fulcrumed upon a rod 61 extending lengthwise of the machine between the upper and lower shaft. It will be observed that the arms 58 are fulcrumed at a point unequally distant from the two ends to compensate for the unequal distance separating the sleeves 59, 60 from the rear ends of the shafts 45, 48 about which ends the shafts swing whereby to cause the feed wheels and rolls to move to an equal extent.

Projecting horizontally in front of the casing 36 is a bracket 62 having pivoted thereon at points 63, 64 respectively pairs of tool shanks 65, 66, which may be independently dismounted by manual withdrawal of the pivot pins 67, 68. These tool shanks extend into the casing through the openings 69, 70 which openings are vertically elongated and covered by upper and lower slides 71, 72, the lower slide has extending from its lower end a projection 73 apertured for the reception of a screw 74 adjustably mounted therein by means of the lock nuts 75. To the upper end of the screw is secured a contractile spring 76 which spring carries at its upper end an apertured finger piece 77 for engagement over a pin 78 projecting from the upper slide 71. The two slides 71, 72 bear respectively upon the upper and lower tool shanks 65, 66 whereby the tool members are yieldingly pressed toward each other, the tension being regulable by means of the screw 74.

The shanks 65, 66 terminate at their inner free ends in oppositely curved tool holders 79, 80, each curved upon the arc of a circle the chord of which is substantially horizontal.

Immediately after the two pairs of horizontally disposed tool holding devices are arranged two pairs of vertically disposed tool holding devices substantially similar to those just described. Here the tool holding shanks 81, 82 are pivoted at 83, 84 upon manually removable pivots 85, 86 in an upstanding bracket 87. The shanks project downwardly into the casing through horizontally elongated slots 88, 88 and are pressed together by slides 89, 90, the slide 90, as in the former case, provided with a projection 91 within an aperture of which the screw 92 is held by means of the adjustable nuts 93, 93, the contractile spring 94 being attached to the screw 92 and provided with an apertured finger piece 95 adapted to engage over the pin 96 carried by the slide 89. The inner ends of the shanks 81, 82 terminate in tool holders 97, 98 having their inner edges curved each upon the arc of a circle, the chords in this case extending vertically.

The axis of the space bounded by the curved inner edges of each pair of tool holders is in longitudinal alinement with the axis of each of the other pairs and the four pairs of tool holders horizontally and vertically disposed are adapted to receive tools adjustably mounted thereon. All of the holders may be provided with curved knives 99 as shown in Figs. 4 and 5 having their edges curved to conform to that of the average ear of corn and with their cutting edges facing toward the front of the machine. In case all of the tool holders are provided with cutting knives the members of the first pair of horizontally disposed blades are adjusted to remove the top of the kernel only, and the blades of the second pair to make a deeper cut from the top and bottom of the ear, while the blades of the first pair of vertically disposed knives and the blades of the second pair of vertically disposed knives are similarly adjusted to make a shallow and deeper cut upon the two sides of the ear. With some kinds of corn, however, especially those having a large kernel, it is found advisable to slit the kernels prior to cutting the same from the ear. Under such circumstances the members of the first pair of horizontally disposed tool holders and the members of the first pair of vertically disposed tool holders are provided with a series of slitting knives 100 secured to the tool holder by means of screws 101 and extending radially beyond the curved inner edge of the holder toward the center of the space bounded thereby. These slitting knives advantageously have their cutting edges curved, as is clearly shown in Fig. 8, so as to effect a drawing cut.

Each of the tool holders has an inclined front face so that the pair present a forwardly flaring approach which assists in guiding the ears between the tools.

After the horizontally and vertically disposed knife holders is arranged a series of scraping tools preferably in the order of two pairs of horizontally disposed scrapers, one pair of vertically disposed scrapers, then two pairs of horizontally disposed scrapers, and finally a pair of scrapers vertically disposed, the adjacent pairs having interposed therebetween one of the feed rolls 56. The members of the pairs of horizontally disposed scrapers are mounted upon the shanks 102, 103 having a bearing within slots 104, 105 at the rear of the machine and pressed toward each other by leaf springs 106, 107, which are placed under tension by means of set screws 108, 109 threaded in the two arms of a yoke 110 whereby initial tension is imparted to said springs to press the two members of the pair of scrapers together. Extending longitudinally of the machine between the rear ends of the shanks 102, 103 is a cam rod 111 having fixed upon its outer end a lever 112 and also a segment rack 113 with which engages a pawl 114 pivoted to the machine frame. By the angular movement of the lever 114 the cam rod 111 is so turned as to separate the rear ends of the shanks 102, 103 for a greater distance and thus place the springs 106, 107 under greater tension from their bearing upon the adjusting screws 108, 109, the engagement of the pawl with the rack serving to maintain as long as desired these changed tension conditions. It will be seen that by means of the set screws 108, 109 the tension of the members of each pair of horizontal scrapers may be adjusted independently of the other members while by means of the lever and cam rod all of the horizontal pairs of scrapers can be placed under uniformly increased tension.

The scraping edge of the upper member of the first pair is advantageously a horizontal right line 115 while the scraping edge of the lower member of the pair is advantageously formed as a V slightly modified 116. In the second pair the scraping edges are reversed, the straight edge being below and the notched edge above. Likewise in the third and fourth pairs the conditions of configuration of the first two pairs are repeated.

After the first two pair of horizontal scrapers, and after the second two pair of horizontal scrapers is inserted a pair of vertically disposed scrapers, the shanks 117 and 118 of which are pivoted to the bracket 119 by means of the removable pivot pins 120, 121. A lever 122 is pivoted at 123 to the shank 117 and has formed integral therewith a rack 124 adapted to be engaged by a pawl 125 pivoted at 126. This lever carries an apertured projection 127 to which is anchored one end of a contractile spring 128 the opposite end being provided with an apertured finger piece 129 adapted to engage over a pin 130 projecting from a plate 131 carried by the shank 118. By the lever 122 the tension of the spring 128 can be increased as desired and maintained by the engagement of the pawl with the rack. The edges 132 of the vertical scrapers are preferably symmetrically formed upon the arc of a circle about the axis of the ears as they are fed therebetween.

From the foregoing description it is thought the operation of the machine will be readily understood. The ears of corn deprived of their husks are supplied one at a time to the feed chute 27 within which they are axially positioned and fed forward by means of the conveyer chains 34, 34. As they enter the opening 41 leading to the casing 36 the forward end is engaged between the first pair of spur wheels 49 and then by the second pair provided with the guard disks 50. In passing the first two pair of spur wheels the ear is brought into alinement vertically with the axis of the following wheels and tools. It is then entered between the first pair of horizontal knives, slitting or cutting as the case may be, and thence passes to the second pair of knives; then through the first pair of vertical knives, slitting or cutting as the case may be, and thence through the second pair of vertically disposed knives; thence it passes through the series of horizontally and vertically disposed scrapers by which the last remnant of the kernels is removed from the cob, the latter being discharged through the opening 42. All of the particles of corn cut from the cob fall through the hopper 37 and are conveyed to machines for further treatment.

Among other modifications as to details which different circumstances of use will suggest it will be obvious that the number and arrangement of the sets of knives and scraping tools may be varied from that herein illustrated and described as adapted to average conditions. The provision for independent and likewise uniform adjustment of the parts with reference to position and tension as also for the interchange of tools imparts to the machine a high degree of flexibility to meet the varying conditions which may arise in use.

I claim:

1. In a machine of the character described, the combination with tools arranged to act on the ears, of a feed trough, and a traveling conveyer in the trough having a depressed medial portion adapted to center the ear with reference to the tools, the medial portion of the trough being lower than said medial portion of the conveyer, the width and depth of the medial depression being such that an ear of corn will be supported therein longitudinally of the conveyer and out of contact with the trough, substantially as described.

2. In a machine of the character described, the combination with tools arranged to act on the ears, of a feed trough, and a traveling conveyer in the trough having a depressed medial portion adapted to center the ear with reference to the tools, said conveyer comprising a pair of belt members arranged in spaced parallel relation between the side walls of the trough, the medial portion of the trough being lower than the upper part of said belt members, the distance between said members and their height above the medial portion of the trough being such that an ear of corn will be supported therebetween longitudinally of the conveyer and out of contact with the trough, substantially as described.

3. In a machine of the character described, the combination with tools arranged to act on the ears, of a feed trough, and a traveling conveyer in the trough having a depressed medial portion adapted to center the ear with reference to the tools, said conveyer comprising a pair of chain members arranged in spaced parallel relation between the side walls of the trough and having upwardly projecting ear engaging portions, the medial portion of said trough being lower than the upper part of said chain members, the distance between said members and their height above the medial portion of the trough being such that an ear of corn will be supported therebetween longitudinally of the conveyer and out of contact with the trough, substantially as described.

4. In a machine of the character described, a plurality of pairs of horizontally disposed vertically spaced tool holders pivotally mounted at one end in the machine frame, the free ends of the members of each pair disposed on opposite sides of and movable toward and from the machine axis, springs connecting the members of each pair, and means disposed between the members of each pair near their pivotal connection, said means acting in unison to force the pivot ends of the members apart whereby to increase the tension of the springs, substantially as described.

5. In a machine of the character described, a plurality of pairs of horizontally disposed vertically spaced tool holders pivotally mounted at one end in the machine frame, the free ends of the members of each pair disposed on opposite sides of and movable toward and from the machine axis, springs connecting the members of each pair, a cam rod extending between the members of the several pairs near their pivotal connection, and means to adjust the rod angularly whereby to force the pivoted ends of the members apart to increase the tension of the springs, substantially as described.

6. A corn cutting machine comprising a plurality of pairs of spaced members, the members of each pair being located on opposite sides of the path of the corn through the machine, spring means for forcing said members against the corn, and means whereby the pressure of said members on the corn, due to said spring means, may be adjusted individually and collectively.

7. A corn cutting machine comprising means for feeding corn therethrough, a plurality of members located adjacent the path of the corn, spring means for forcing said members against the corn, and means whereby the pressure of said members on the corn, due to said spring means, may be adjusted individually and collectively.

8. A corn cutting machine comprising means for feeding corn therethrough, a pair of spaced pivotally mounted members having parts located on opposite sides of the path of the corn, slidably mounted members engaging said pivotally mounted members, and spring means for forcing said slidably mounted members toward each other.

9. A corn cutting machine comprising means for feeding corn therethrough, a pair of spaced pivotally mounted members having parts located on opposite sides of the path of the corn, a lever mounted on one of said members and a spring secured to said lever and to the other member.

10. A corn cutting machine comprising means for feeding corn therethrough, a pair of spaced pivotally mounted members having parts located on opposite sides of the path of the corn, a lever mounted on one of said members, a spring secured to said lever and to the other member, and means for retaining said lever in adjusting position.

11. A corn cutting machine including means for feeding corn therethrough, a plurality of members located adjacent the path of the corn, spring means for forcing said members against the corn, and means whereby the pressure of said members on the corn due to said spring means may be adjusted collectively.

JOHN C. McINTYRE.

Witnesses:
John B. Wallbridge,
Cecil Young.